United States Patent [19]

Bender-Zanoni et al.

[11] Patent Number: 5,074,402
[45] Date of Patent: Dec. 24, 1991

[54] EXTENSIBLE AMMUNITION CONVEYOR

[75] Inventors: Joseph F. Bender-Zanoni, Grand Isle; David L. Maher, Hero, both of Vt.

[73] Assignee: General Electric Company, Burlington, Vt.

[21] Appl. No.: 633,555

[22] Filed: Dec. 24, 1990

[51] Int. Cl.⁵ .............................................. B65G 15/14
[52] U.S. Cl. ................... 198/626.1; 198/626.5; 198/812; 198/817
[58] Field of Search ............... 198/626.1, 626.5, 626.6, 198/812, 817

[56] References Cited

U.S. PATENT DOCUMENTS

| | | | |
|---|---|---|---|
| 1,405,233 | 1/1922 | Lemoine | 198/817 |
| 2,491,255 | 12/1949 | Edwards | 198/817 X |
| 2,768,732 | 10/1956 | Muhlenbruch | 198/817 X |
| 2,919,013 | 12/1959 | Culpepper | 198/817 X |
| 3,088,581 | 5/1963 | Rostal | 198/817 |
| 3,826,353 | 7/1974 | Greasley . | |
| 3,997,048 | 12/1976 | Haroy | 198/817 X |
| 4,312,540 | 1/1982 | Thompson . | |
| 4,565,284 | 1/1986 | Seragnoli et al. | 198/812 X |
| 4,709,799 | 12/1987 | Ljungberg | 198/817 X |
| 4,813,526 | 3/1989 | Belanger . | |

Primary Examiner—D. Glenn Dayoan
Attorney, Agent, or Firm—Bailin L. Kuch; Robert A. Cahill

[57] ABSTRACT

An extensible ammunition conveyor includes telescoping conveyor sections mounting pairs of laterally spaced sprockets adjacent the conveyor section ends. A pair of endless chains are trained about these sprockets in coextensive, transversely spaced relation with each chain having transversely lapping run portions extending along the telescoped end portions of the conveyor sections. The sprockets of each pair are mounted in angularly relation to provide an effectively V-shaped open trough for transversely confining cylindrical ammunition rounds during conveyance motivated by driving the chains in unison. Jointly braking and driving the chains in an appropriate direction produces powered extension and contraction of the conveyor.

9 Claims, 4 Drawing Sheets

EXTENSIBLE AMMUNITION CONVEYOR

The present invention relates to article conveyors and particularly to a linear conveyor of adjustable length for conveying rounds of large caliber ammunition.

BACKGROUND OF THE INVENTION

Heretofore, the task of handling ammunition for large caliber artillery pieces has been highly labor intensive and time consuming. To reduce the number of military personnel required and to save time, both in terms of resupplying and loading artillery pieces, automated ammunition handling equipment has been proposed. One automation approach is equip the artillery piece, such as a self-propelled howitzer, with a magazine having a mechanized internal conveyor to convey resupplied ammunition into magazine storage and then to convey the ammunition from their magazine storage locations successively to the howitzer for loading by mechanized equipment.

To provide expeditious logistical support for the howitzer, a resupply vehicle is similarly equipped with a magazine having a mechanized internal conveyor for conveying ammunition into and out of magazine storage. The resupply vehicle and the self-propelled howitzer rendezvous in the field where the ammunition is transferred from the resupply magazine to the gun magazine. Since howitzer ammunition consists of projectiles weighing as much as one hundred pounds or more and propellant canisters in the range of twenty five to fifty pounds, mechanized equipment to handle the ammunition transfer from magazine to magazine is a vital need. Since it would be extremely difficult to arrange the resupply vehicle and the self-propelled howitzer in any pre-defined physical relation, the transfer equipment must be readily adjustable to accommodate variations in vehicle separation and angular orientation. Also, the transfer equipment must be capable of handling the ammunition in a safe and expeditious manner under adverse conditions, e.g., in the heat of battle.

SUMMARY OF THE INVENTION

It is accordingly an object of the present invention to provide mechanized equipment for conveying articles, such as large caliber ammunition.

A further object is to provide conveying equipment of the above-character, which is readily adaptable to varying article transfer situations.

Another object is to provide a linear article conveyor of the above-character, which is readily adjustable in length.

An additional object is to provide an extensible article conveyor of the above-character, wherein conveyor extension and retraction is mechanized.

A still further object is to provide an extensible conveyor of the above-character, which is particularly structured to convey cylindrical objects such as ammunition rounds.

Yet another object is to provide an extensible ammunition conveyor of the above-character, wherein ammunition conveyance is effected in a safe and smooth manner.

Other objects of the invention will in part be obvious and in part appear hereinafter.

In accordance with the present invention, there is provided an extensible conveyor having at least two conveyor sections arranged in end-to-end telescopic relation. Each conveyor section is equipped with a pair of laterally spaced sprockets adjacent each end. A pair of endless, article-conveying chains are trained about the conveyor section sprockets in coextensive, laterally spaced relation with each chain having transversely lapping run portions extending along the telescoped end portions of the conveyor sections. The chains are driven in unison from a common source to linearly convey articles resting on the conveyor chains. The transversely lapping run portions of the conveyor chains provide a smooth transition for the articles between conveyor sections.

For articles of cylindrical configuration, such as large caliber ammunition rounds, the sprockets of each pair are mounted in tilted relation, such that the article conveying runs of the chains provide an effectively V-shaped, open trough, moving support for the articles. Power extension and retraction of the conveyor is achieved by braking one pair of sprockets and driving another pair in the appropriate direction.

The invention accordingly comprises the features of construction, combination of elements, and arrangement of parts, all as detailed below, and the scope of the invention will be indicated in the claims.

BRIEF DESCRIPTION OF THE DRAWINGS

For a full understanding of the nature and objects of the invention, reference may be had to the following Detailed Description, taken in conjunction with the accompanying drawings, in which.

Corresponding reference numerals refer to like parts throughout the several views of the drawings.

DETAILED DESCRIPTION

Figure 1:
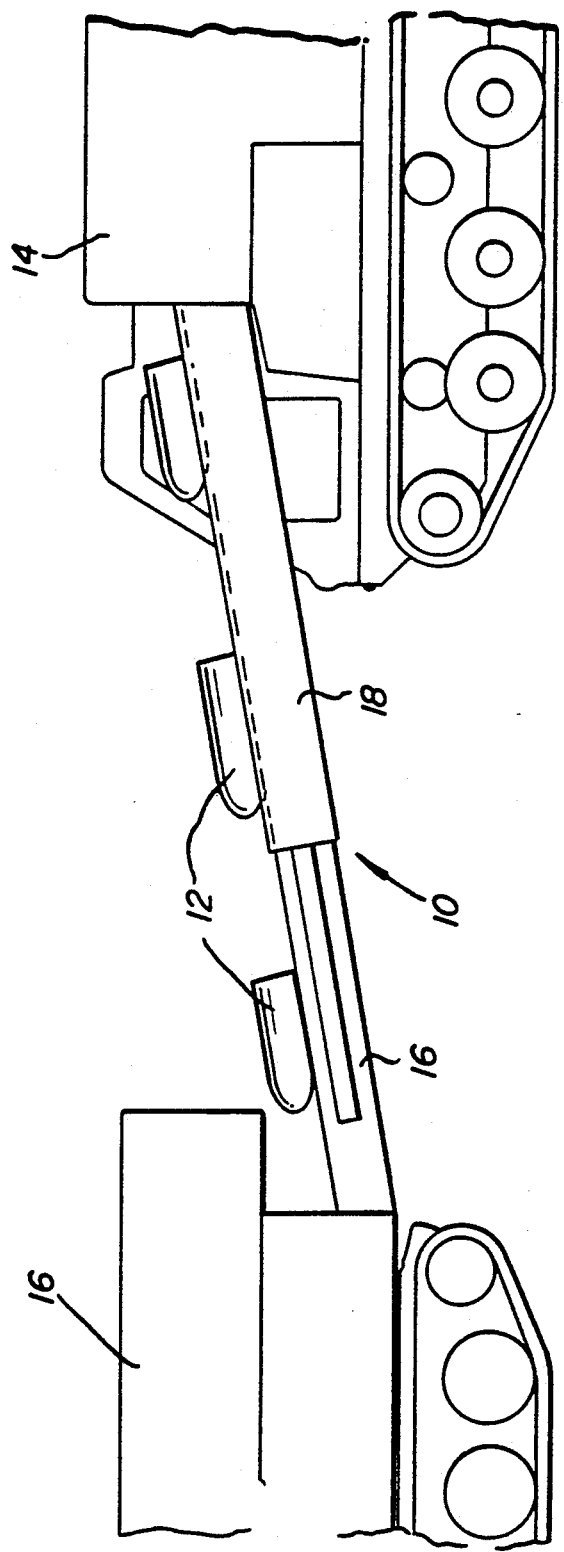
FIG. 1 is a simplified side view of the extensible conveyor of the present invention in its application as an ammunition conveyor.

The extensible conveyor of the present invention, generally indicated at 10 in FIG. 1, is illustrated in its application to conveying ammunition rounds, such as projectiles 12, from the magazine of a resupply vehicle 14 to the magazine of a self-propelled howitzer 16. To accommodate variations in vehicle separation, conveyor 10 is provided with at least two conveyor sections 16 and 18 mounted in telescopic relation. When not in use, the conveyor may be stowed in the resupply vehicle.

Figure 2:
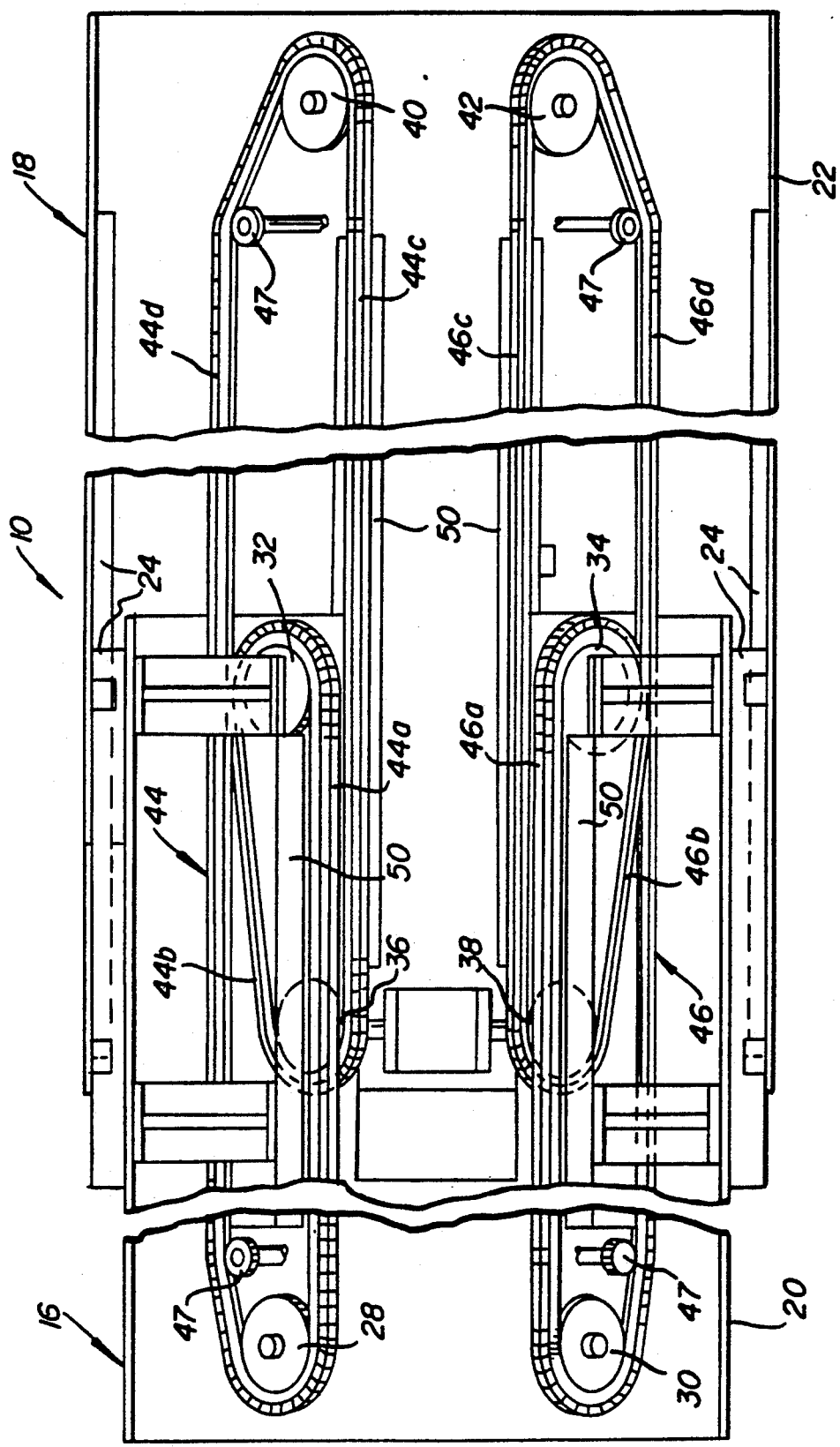
FIG. 2 is a plan view of the ammunition conveyor of FIG. 1.

As seen in FIG. 2, conveyor section 16 includes a longitudinally elongated U-shaped channel 20 which is dimensioned to be telescopically received within a longitudinally elongated, U-shaped channel 22 of conveyor section 18. Channels 20 and 22 are equipped with opposed pairs of slidingly interengaging, longitudinally elongated tracks 24 to mount the conveyor sections to each other for telescopic relative movement.

Figure 4:
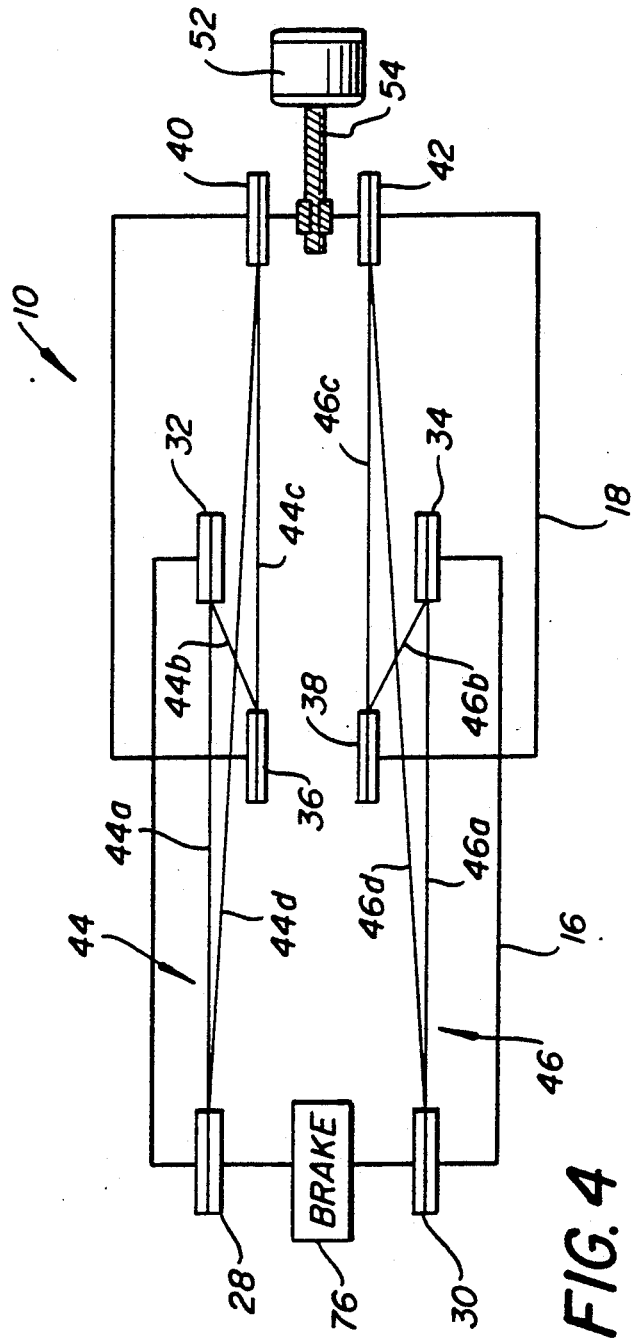
FIG. 4 is a diagrammatic plan view of the ammunition conveyor of FIG. 1.

Referring jointly to FIGS. 2 and 4, mounted to channel 20 adjacent the free left end of conveyor section 16 is a pair of laterally spaced sprockets 28 and 30. A pair of laterally spaced sprockets 32 and 34 are mounted to channel 20 adjacent the right end of conveyor section 16, which is telescopically nested within the left end of channel 22 of conveyor section 18. As best seen in FIG. 4, sprockets 28 and 32 are in relative longitudinal alignment, as are sprockets 30 and 34. A pair of laterally spaced sprockets 36 and 38 are mounted to channel 22 of conveyor section 18 adjacent its left end, and a pair of laterally spaced sprockets 40 and 42 are mounted to channel 22 adjacent its free right end. Sprockets 36 and 40 are longitudinally aligned, as are sprockets 38 and 42. It is noted that the lateral or transverse spacing between paired sprockets 28, 30 and 32, 34 of conveyor section 16 is slightly greater than the transverse spacing between paired sprockets 36, 38 and 40, 42 of conveyor section 18 to accommodate relative telescopic movement of the conveyor sections.

Still referring to FIGS. 2 and 4, a first endless article conveying chain 44 is trained about sprocket 28 for an upper longitudinal run 44a to sprocket 32. The chain is trained about sprocket 32 for a angular lower run 44b back to and about sprocket 36 where it continues on to sprocket 40 along an upper longitudinal run 44c. From sprocket 40, chain 44 returns back to sprocket 28 along a lower angular run 44d. A second endless article conveying chain 46 is likewise trained about sprocket 30 forwardly to sprocket 34 along an upper longitudinal run 46a, back to sprocket 38 along a lower angular run 46b, forwardly along an upper longitudinal run 46c to sprocket 42 and back to sprocket 30 along a lower angular run 46d. The sprockets 32, 34, 36 and 38 at the telescoped ends of the conveyor sections are of a slightly smaller diameter than sprockets 28, 30, 40 and 42 so as to avoid interference between the crossing, lower chain runs 44b and 44d in the case of chain 44 and crossing lower chain runs 46b and 46d in the case of chain 46. Alternatively and as seen in FIG. 2, idler sprockets 47 may be utilized to provide the requisite clearance between these crossing lower chain runs.

It is thus seen that sprockets 28, 32, 36 and 40 comprise a first set of longitudinally distributed sprockets about which chain 44 is trained, while sprockets 30, 34, 38 and 42 comprise a second set of longitudinally distributed sprockets about which chain 46 is trained in transversely spaced, coextensive relation with chain 44.

Figure 3:
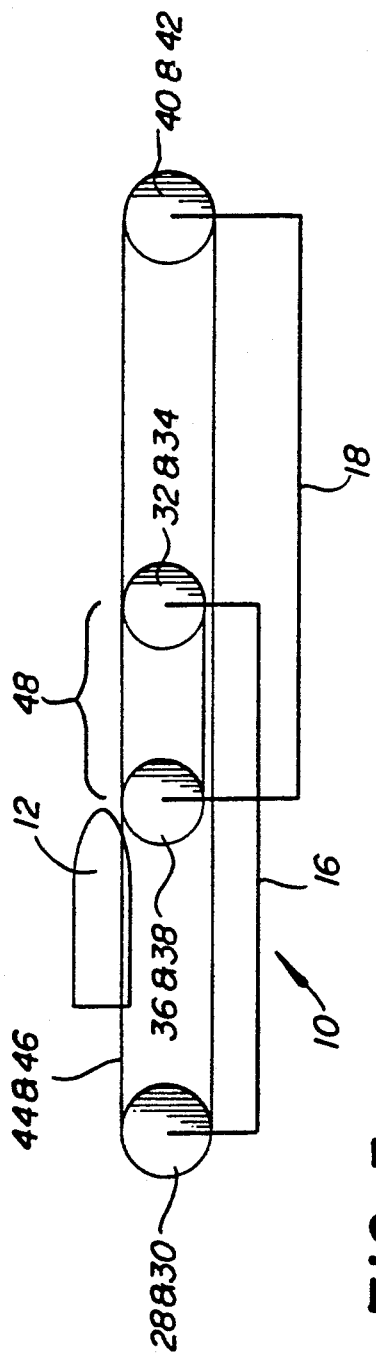
FIG. 3 is a diagrammatic side view of the ammunition conveyor of FIG. 1.

The upper runs 44a and 44c of chain 44 are transversely offset as seen in exaggeration in FIG. 4, but, as seen in FIG. 3, lie in a common plane. The same is true of upper runs 46a and 46c of chain 46. Consequently, these upper chain runs provide even running surfaces on which articles are supported during conveyance from end to end of conveyor 10. The transversely lapping portions of runs 44a and 44c and runs 46a and 46c, indicated at 48 in FIG. 3, provide a smooth article conveyance transition between conveyor sections 16 and 18. It will be appreciated that, as the relative positions of the conveyor sections are telescopically adjusted to vary the conveyor length, the longitudinal length of the lapping portions 48 of runs 44a, 44c and 46a, 46c changes accordingly to maintain chains 44 and 46 in taut conditions. As seen in FIG. 2, tracks 50 are mounted by channels 20 and 22 to provide coextensive, underlying support for the upper chain runs 44a, 44c, 46a and 46c and the articles resting thereon.

Figure 5:
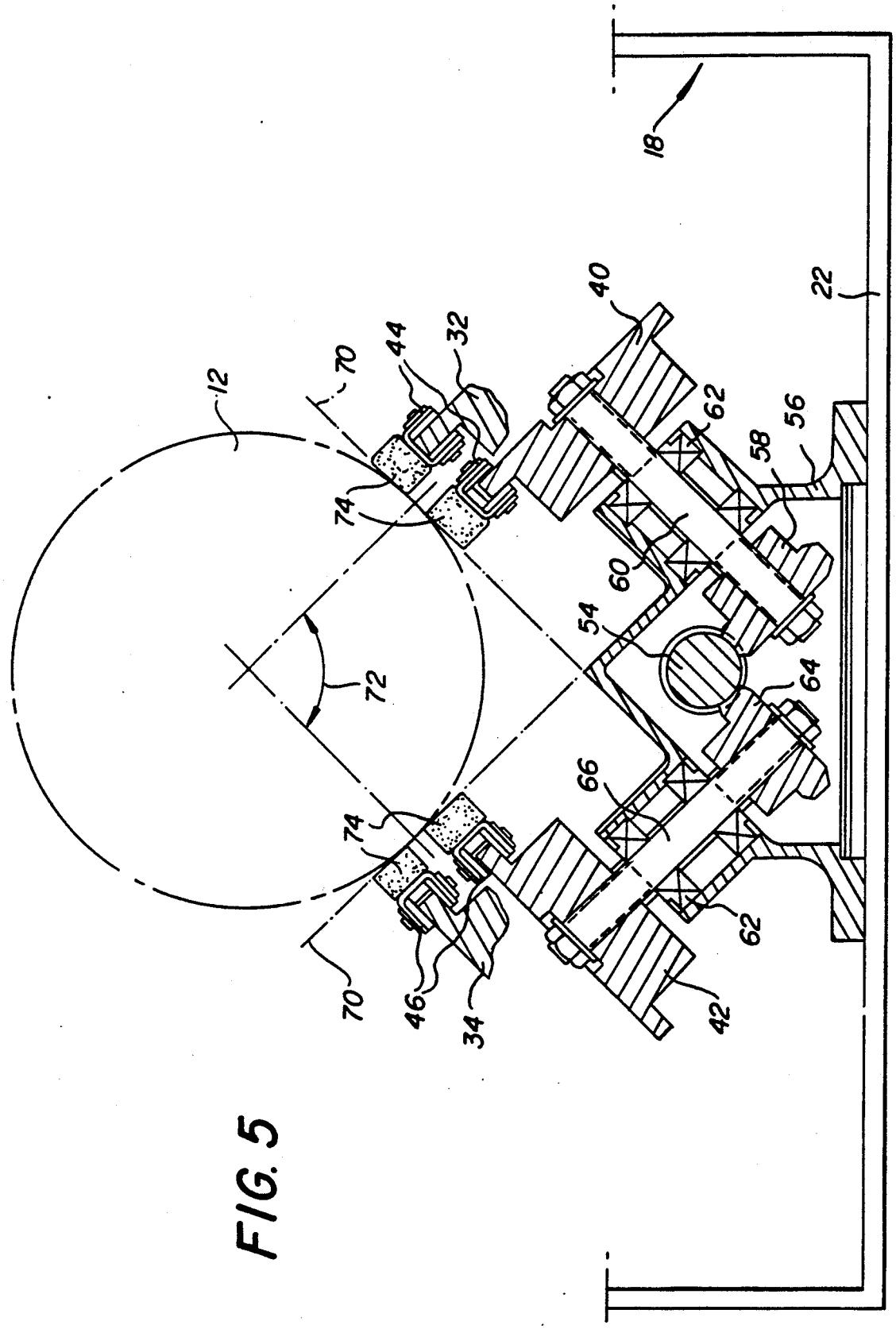
FIG. 5 is a detailed transverse sectional view of the ammunition conveyor of FIG. 1.

To drive the conveyor chains in synchronism, a motor 52 is mounted to one of the conveyor sections, e.g. section 18, to commonly drive the sprockets of one pair, such as sprockets 40 and 42 seen in FIG. 4. Thus, the motor drives a worm 54 journalled in a bearing mount 56 affixed to channel 22, as seen in FIG. 5. A first worm gear 58, driven off of worm 54 is keyed to one end of a shaft 60 journalled in mount 56 by bearings 62. Sprocket 40 is affixed to the other end of this shaft. The worm also drives a second worm gear 64 which is drivingly connected to sprocket 42 via a shaft 66 journalled in the mount by bearings 62. Thus, with both chains 44 and 46 be driven off a common drive element, worm 54, smooth, straightline conveyance of articles along the adjustable length of conveyor 10 is achieved.

FIG. 5 also illustrates an appropriate sprocket mounting arrangement for conveying cylindrical articles such as projectiles 12. That is, the sprockets of each pair are mounted by bearing blocks in non-parallel, angular relation, such that the chains 44 and 46 provide an effectively V-shaped open trough or channel, indicated by phantom lines 70, for both supporting and transversely confining the projectiles while being longitudinally conveyed along the length of conveyor 10. In the illustrated embodiment of FIG. 5, the sprockets of each pair are tilted 45° off vertical such that they are relatively oriented to an included angle, indicated at 72, of 90°. It will be appreciated that this sprocket angular orientation may be varied to a range of included angles, e.g. 45° to 90°, depending on the physical characteristics of the articles to be conveyed. In the case of certain projectiles, an included angle of approximately 60° may be preferred. If the articles are flat sided, the sprocket orientations would be vertical, i.e., in parallel relation, and thus the included angle of each sprocket pair would be essentially zero degrees. In this case, the sprockets of the driven pair could be carried on a common shaft driven off the worm via a single worm gear.

As seen in FIGS. 2 and 5, individual blocks 74 of a suitable hard rubber or elastomeric composition are affixed to the links of chains 44 and 46. These blocks provide cushioned, high friction surfaces engaging the articles to ensure non-slip article conveyance when the inclination of the conveyor is particularly steep.

In accordance with an additional features of the present invention, conveyor 10 is equipped with a brake 76, as seen in FIG. 4, to accommodate powered extension and contraction of the conveyor. When this brake is actuated to halt rotation of sprockets 28 and 30 and sprockets 40 and 42 are driven in the clockwise direction seen in FIG. 3, the portions of chains 44 and 46 in lower runs 44b and 46b are tensioned, causing the conveyor sections to telescope outwardly and extend the conveyor. Conversely, when sprockets 28 and 30 are braked and sprockets 40 and 42 are driven in the counterclockwise direction, the lower runs 44d and 46d of the chains are put in tension, and the conveyor sections must telescope inwardly to retract the conveyor.

While the present invention has been disclosed using link chains as the endless, article conveying chains, it will be appreciated that the conveyor chains may be in the form narrow belts trained about wheeled elements, such as pulleys or cog wheels.

It is seen from the foregoing that the objects set forth above, including those made apparent from the preceding Detailed Description, are efficiently attained, and, since certain changes may be made in the construction set forth without departing from the scope of the invention it is intended that matters of detail be taken as illustrative and not in a limiting sense.

Having described the invention, what is claimed as new and desired to secure by letters patent is:

1. A extensible conveyor for cylindrical articles comprising, in combination:
   A. a first longitudinally elongated conveyor section having first and second ends;
   B. a second longitudinally elongated conveyor section having third and fourth ends, said first and second conveyor sections mounted for relative telescopic movement with a portion of said second end of said first conveyor section and a portion of said third end of said second conveyor section in telescoped relation;
   C. a first pair of first and second sprockets mounted in transversely spaced relation to said first conveyor section adjacent said first end;
   D. a second pair of first and second sprockets mounted in transversely spaced relation to said first conveyor section adjacent said second end,
      1) said first sprockets of said first and second pairs being in longitudinal alignment, and
      2) said second sprockets of said first and second pairs being in longitudinal alignment;
   E. a third pair of first and second sprockets mounted in transversely spaced relation to said second conveyor section adjacent said third end;
   F. a fourth pair of first and second sprockets mounted in transversely spaced relation to said second conveyor section adjacent said fourth end,
      1) said first sprockets of said third and fourth pairs being in longitudinal alignment,
      2) said second sprockets of said third and fourth pairs being in longitudinal alignment,
      3) said first sprockets of said first and second pairs being transversely offset relative to said first sprockets of said third and fourth pairs, and
      4) said second sprockets of said first and second pairs being transversely offset relative to said second sprockets of said third and fourth pairs;
   G. a first endless article-conveying chain trained about said first sprockets of said first, second, third and fourth pairs, said first chain including a first article-conveying upper run extending longitudinally between said first sprockets of said first and second paris, a second article-conveying upper run extending longitudinally between said first sprockets of said third and fourth pairs, a first lower run extending transversely between said first sprockets of said second and third pairs, a second lower run extending transversely between said first sprockets of said first and fourth pairs, and transversely lapping run portions of said first and second upper runs extending along the longitudinal separation between said first sprockets of said second and third pairs;
   H. a second endless article-conveying chain trained about said second sprockets of said first, second third and fourth pairs, said second chain including a third article-conveying upper run extending longitudinally between said second sprockets of said first and second pairs, a fourth article-conveying upper run extending longitudinally between said second sprockets of said third and fourth pairs, a first lower run extending transversely between said second sprockets of said second and third pairs, a second lower run extending transversely between said second sprockets of said first and fourth pairs, and transversely lapping run portions of said third and fourth upper runs extending along the longitudinal separation between said second sprockets of said second and third pairs, said first and second upper runs of said first chain and said third and fourth upper runs of said second chain generally lie in respective common planes, said first and second sprockets of each said first, second, third and fourth pair being mounted in angular relation, whereby said upper runs of said first and second chains define an effectively V-shaped open trough for transversely confining the cylindrical articles during longitudinal conveyance thereof; and
   I. means for driving one of the said first sprockets and one of said second sprockets in synchronism.

2. The extensible conveyor defined in claim 1, wherein said first and second sprockets of each said first, second, third and fourth pair are mounted in an angular relation defining an included angle in the range of 45 to 90 degrees.

3. The extensible conveyor defined in claim 2, wherein said first and second chains are link chains having individual blocks affixed to the links thereof to provide cushioned, high friction surfaces on which the articles rest during conveyance.

4. The extensible conveyor defined in claim 3, wherein the articles are rounds of large caliber ammunition.

5. The extensible conveyor defined in claim 1, which further includes means for braking another one of said first sprockets and another one of said second sprockets while said driving means is selectively driving said one first sprocket and said one second sprocket in either of two opposition directions to achieve powered extension and contraction of said conveyor depending upon the driving direction.

6. The extensible conveyor defined in claim 1, wherein said driving means includes a motor, a worm driven by said motor, a first worm gear meshed with said worm and drivingly connected with said one first sprocket, and a second worm gear meshed with said worm and drivingly connected with said one second sprocket.

7. An extensible conveyor for cylindrical objects comprising, in combination:
   A. first and second longitudinally elongated conveyor sections having telescoped adjacent end portions and mounted together for relative telescopic movement to adjust the length of said conveyor;
   B. a first set of longitudinally distributed wheeled elements mounted by said first and second conveyor sections;
   C. a second set of longitudinally distributed wheeled elements mounted by said first and second conveyor sections in transversely spaced, coextensive relation with said first set of wheeled elements;
   D. a first endless article-conveying chain trained about said first set of wheeled elements and having transversely lapping run portions extending along said telescoped end portions of said first and second conveyor sections, said first chain including upper run portions extending from said lapping run portions in opposite longitudinal directions to respective free ends of said first and second conveyor sections opposite said telescoped end portions;
   E. a second endless article-conveying chain trained about said second set of wheeled elements and having transversely lapping run portions extending along said telescoped end portions of said first and second conveyor sections, said second chain including upper run portions extending from said lapping portions in opposite longitudinal directions to said first and second conveyor sections free ends, said upper runs and lapping run portions of said first and second chains lying in respective common planes, said wheeled elements of said first and second sets being mounted in respective angular relation to provide with said first and second chains an effectively V-shaped, open trough for transversely confining the cylindrical articles during longitudinal conveyance; and F. means for driving said first and second chains in synchronism.

8. The extensible conveyor defined in claim 7, wherein said wheeled elements of said first and second sets are mounted in respective angular relation to provide an effectively V-shaped, open trough for transversely confining cylindrical articles during longitudinal conveyance.

9. The extensible conveyor defined in claim 8, wherein the cylindrical objects are rounds of large caliber ammunition.

* * * * *